United States Patent
Cameron (10) Patent No.: US 7,032,093 B1
(45) Date of Patent: Apr. 18, 2006

(54) ON-DEMAND ALLOCATION OF PHYSICAL STORAGE FOR VIRTUAL VOLUMES USING A ZERO LOGICAL DISK

(75) Inventor: Douglas J. Cameron, Santa Cruz, CA (US)

(73) Assignee: 3PARdata, Inc., Fremont, CA (US)

(*) Notice: Subject to any disclaimer, the term of this patent is extended or adjusted under 35 U.S.C. 154(b) by 212 days.

(21) Appl. No.: 10/636,145

(22) Filed: Aug. 6, 2003

Related U.S. Application Data (60) Provisional application No. 60/402,223, filed on Aug. 8, 2002.

(51) Int. Cl.
  *G06F 12/02* (2006.01)
(52) U.S. Cl. .................. 711/170; 711/148; 711/153; 711/147; 711/6; 711/4; 711/173
(58) Field of Classification Search .............. None
  See application file for complete search history.

(56) References Cited

U.S. PATENT DOCUMENTS

| | | | |
|---|---|---|---|
| 5,313,626 A * | 5/1994 | Jones et al. ............ | 714/5 |
| 5,530,960 A * | 6/1996 | Parks et al. ............ | 710/5 |
| 5,630,093 A * | 5/1997 | Holzhammer et al. ...... | 711/115 |
| 5,937,435 A * | 8/1999 | Dobbek et al. .......... | 711/202 |
| 5,974,544 A * | 10/1999 | Jeffries et al. ........ | 713/1 |
| 6,035,306 A * | 3/2000 | Lowenthal et al. ....... | 707/200 |
| 6,745,207 B1 * | 6/2004 | Reuter et al. .......... | 707/200 |

\* cited by examiner

*Primary Examiner*—B. James Peikari
(74) *Attorney, Agent, or Firm*—Patent Law Group LLP; David C. Hsia (57) ABSTRACT

In one embodiment of the invention, a virtual volume is divided into "filled" and "empty" virtual volume (VV) regions. Empty VV regions are mapped to a special zero logical disk that does not consist of any physical disk regions. When a host writes to an empty VV region, a logical disk (LD) region is allocated to the empty VV region so the formerly empty VV region becomes a filled VV region mapped to the allocated LD region. If there are no LD regions available, a new logical disk is created. Additional physical storage can be added to the storage server to create new logical disks as the use of the virtual volume grows. Physical allocation warning points and limits allow the system administrator to be alerted to and to control physical allocation for each individual VV and the set of VVs drawing from the same data allocation control structure (DC).

9 Claims, 9 Drawing Sheets

Virtual volume layer

ON-DEMAND ALLOCATION OF PHYSICAL STORAGE FOR VIRTUAL VOLUMES USING A ZERO LOGICAL DISK

CROSS REFERENCE TO RELATED APPLICATIONS

This application claims the benefit of U.S. Provisional Application No. 60/402,223, filed Aug. 8, 2002, and incorporated herein by this reference.

FIELD OF THE INVENTION

This invention relates to a utility storage server and more particularly to virtual volume management of the utility storage server.

DESCRIPTION OF RELATED ART

A utility storage server may be defined as any carrier-class storage system that provisions physical storage to multiple users and/or applications. To meet the demands of multiple users and applications, a system administrator has to purchase enough physical storage for the users and the applications. Often the purchased physical storage is underutilized as the users and the applications generally fill their provisioned storage over time. Thus, what is needed is a method that allows the system administrator to increase asset utilization and defer expenses spent on the physical storage.

SUMMARY

In one embodiment of the invention, a method is provided to allow a system administrator of a utility storage server to provision virtual volumes several times larger than the amount of physical storage within the storage server. A virtual volume is a representation of multiple disk resources as a single large volume to a host or an application. In one embodiment, virtual volume is divided into "filled" and "empty" virtual volume (VV) regions. Filled VV regions are mapped to regions of a RAID logical disk that consists of multiple physical disks. Empty VV regions are mapped to a special zero logical disk that does not consist of any physical disks. When a host or an application writes to an empty VV region, a logical disk (LD) region is allocated to the empty VV region so the formerly empty VV region becomes a filled VV region mapped to the allocated LD region. If there are no LD regions available, a new logical disk is created. Thus, a virtual volume appears much larger than the actual physical capacity dedicated to the volume because of the empty VV regions. Additional physical storage can be added to the storage server to create new logical disks as the use of the virtual volume grows. Furthermore, the underlying file system or database structure written on the volume remains unchanged as it was created for the large virtual volume size.

DETAILED DESCRIPTION

For a description of a utility storage server, please see U.S. application Ser. No. 09/633,088, entitled "Data Storage System," now U.S. Pat. No. 6,658,478, and U.S. patent application Ser. No. 09/883,681, entitled "Node Controller for a Data Storage System," which are incorporated by reference in their entirety.

Figure 1:
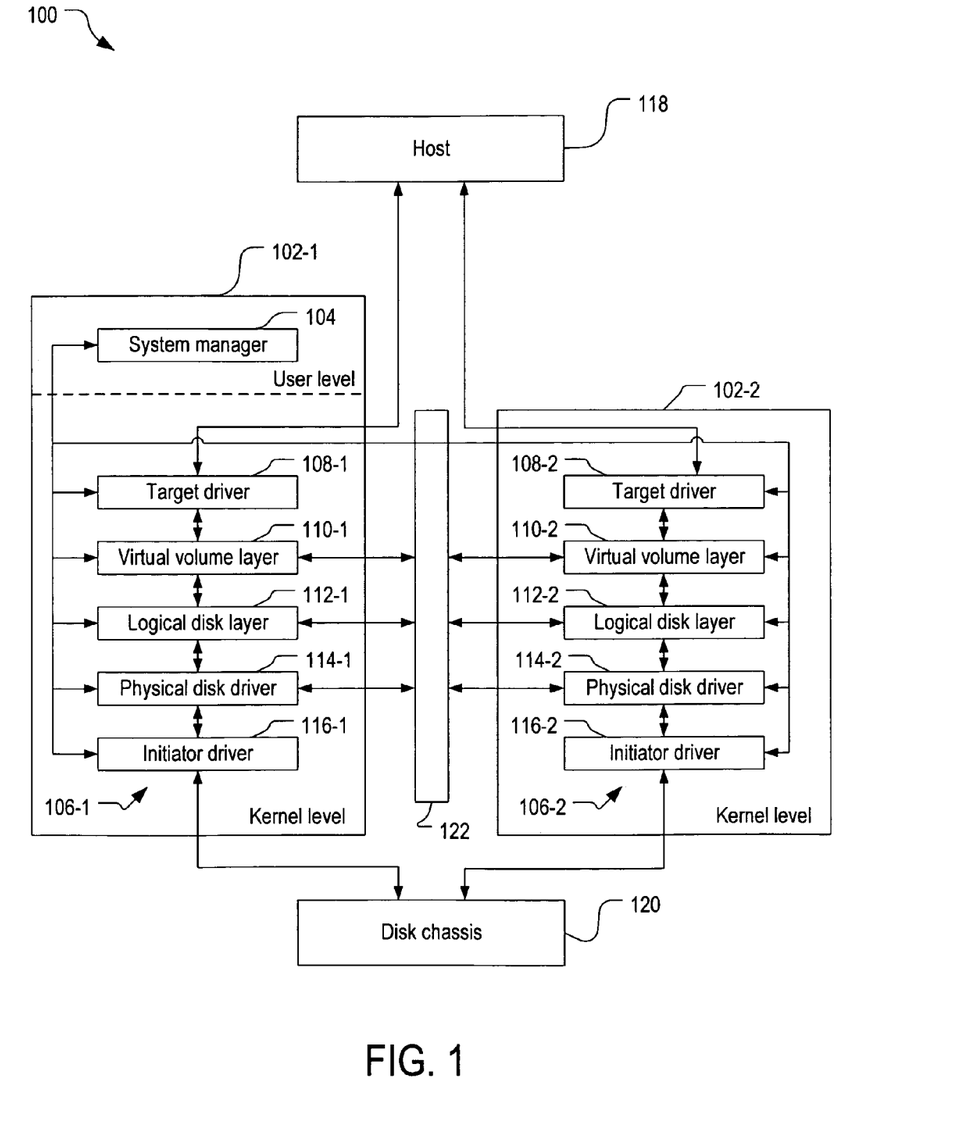
FIG. 1 illustrates a software architecture of a utility storage server in one embodiment of the invention.

FIG. 1 illustrates a software architecture of a utility storage server 100 in one embodiment. For simplicity, utility storage server 100 is shown to include a cluster of nodes 102-1 and 102-2 although the cluster may include additional nodes.

Node 102-1 includes a system manager 104 residing in the user level above the operating system and a data stack 106-1 residing in the kernel level of the operating system. Data stack 106-1 includes a target driver 108-1, a virtual volume layer 110-1, a logical disk layer 112-1, a physical disk layer 114-1, and an initiator driver 116-1. A host 118 sends read and write requests of a virtual volume to target driver 108-1 using, e.g., the SCSI protocol. Target driver 108-1 communicates the read and write requests to virtual volume layer 110-1. Volume layer 110-1 organizes multiple logical disks into a virtual volume. In addition, volume layer 110-1 maps the regions in the virtual volume to regions in the logical disk and sends the read/write requests to the proper logical disk within the logical disk layer 112-1. Logical disk layer 112-1 organizes "chunklets" of physical disks into logical disks of specific RAID levels. Chunklets are contiguous segments of disk space of, e.g., 256 MB. Physical disk layer 114-1 routes the physical disk read and write requests to the appropriate node with access to the physical disk drives on disk chassis 120. Initiator driver 116-1 performs the actual reads and writes to the physical disk drive using, e.g., the SCSI protocol.

Similarly, node 102-2 includes a data stack 106-2 residing in the kernel level. Data stack 106-2 also includes a target driver 108-2, a virtual volume layer 110-2, a logical disk layer 112-2, a physical disk layer 114-2, and an initiator driver 116-2. Components of data stacks 106-1 and 106-2 communicate by a node-to-node link 122.

System manager 104 resides only on one of the nodes of utility storage server 100. If system manager 104 fails at one of the nodes, it can be restarted at another node. System manager 104 presents a single system image of utility storage server 100. System manager 104 also services events from the data stacks, delivers configuration commands to the data stacks, and records system configuration information in a table of content (TOC) on a physical disk drive.

Figure 2:
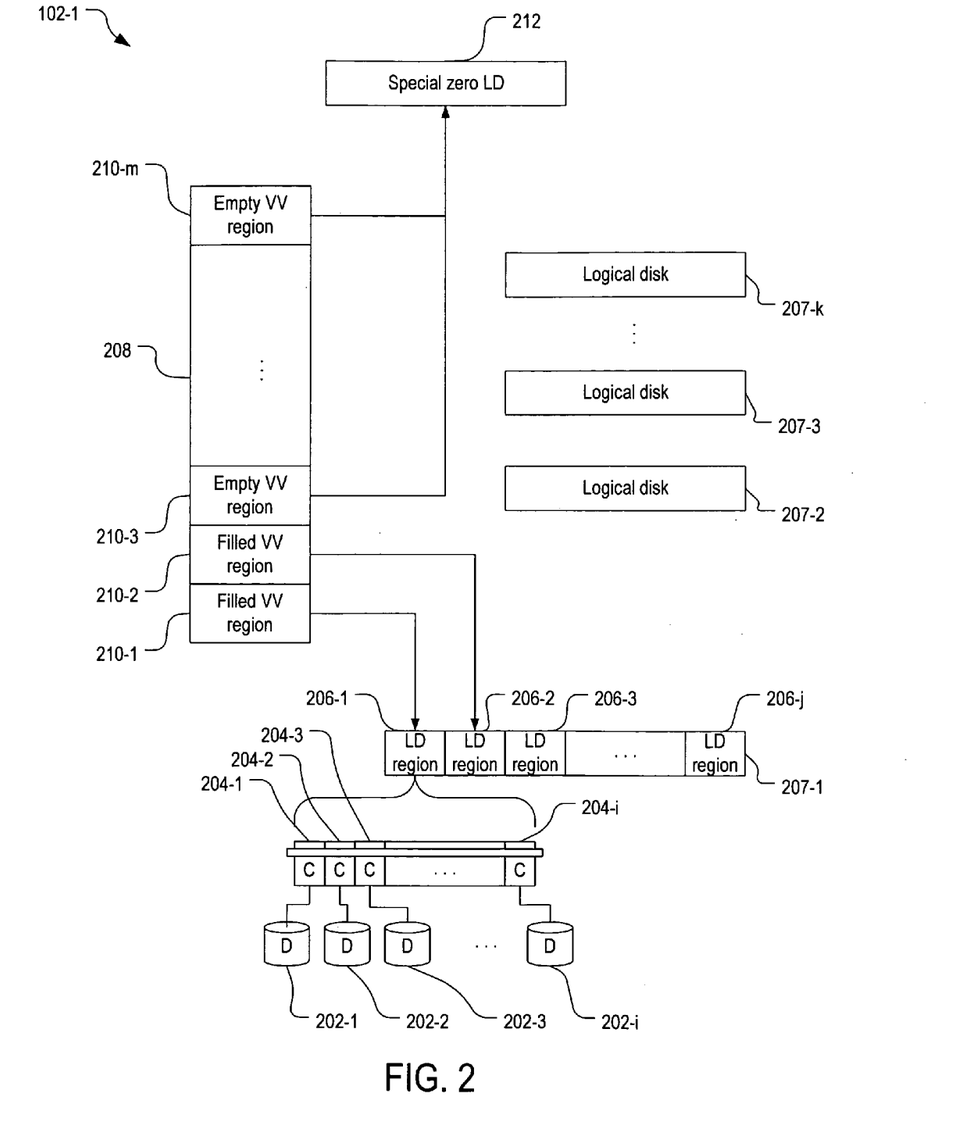
FIG. 2 illustrates a representation of the mapping of a virtual volume to logical disks of a node in one embodiment.

FIG. 2 illustrates a representation of the mapping of a virtual volume 208 to logical disks 207-1 to 207-k of node 102-1 in one embodiment. Virtual volume 208 is a table consisting of VV regions 210-1 to 210-m. Each VV region is identified by an ID of virtual volume 208 and an offset from the starting address of virtual volume 208. Each VV region represents a predetermined number of data blocks. Each data block is assumed to be located at an offset from the starting address of virtual volume 208.

A VV region can be "filled" or "empty". A filled VV region stores a pointer to a corresponding LD region in a logical disk. For example, filled VV region 210-1 stores a pointer to LD region 206-1 of logical disk 207-1. The pointer consists of an ID of the logical disk and an offset of the LD region from the starting address of the logical disk.

An empty region stores a pointer to a special zero logical disk 212 without a logical disk having actual physical disk space. For example, empty regions 210-3 stores a pointer to special zero logical disk 212. The pointer consists of an ID of special zero logical disk 212.

The empty regions allow virtual volume 208 to appear larger to host 118 than its actual physical capacity. When host system 118 reads an empty region, LD layer 112-1 will return all zeros because there are no data. When host system 118 writes to an empty region, LD layer 112-1 will post an event to system manager 104 indicating that actual physical disk space needs to be provided for the empty region. System manager 104 responds by allocating an additional LD region to LD layer 112-1. To account for the delay in allocating the additional LD region, LD layer 112-1 will queue the various write requests to be processed after the LD region has been allocated.

Figure 3A:
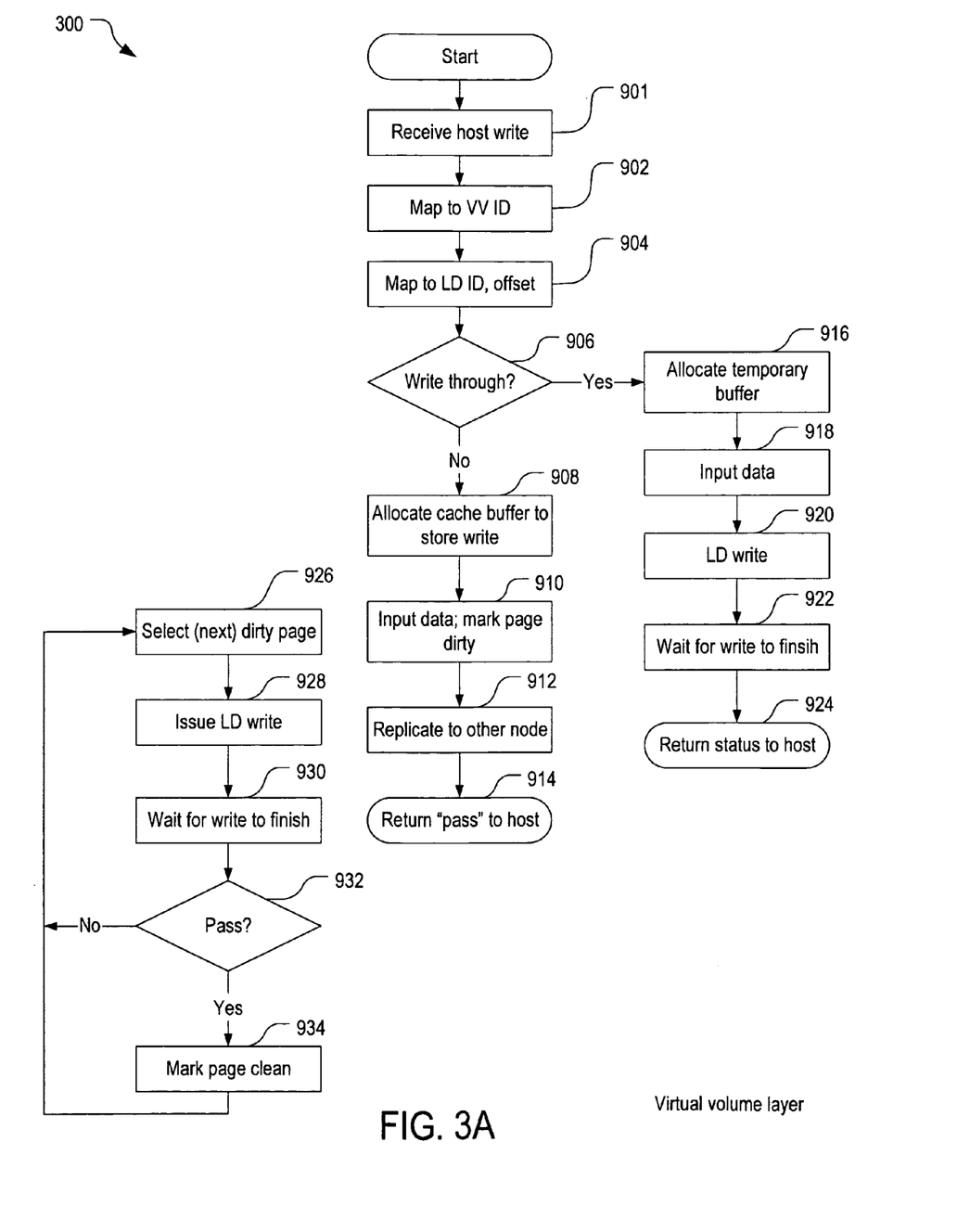
FIGS. 3A and 3B illustrate a method for a volume layer and a logical disk layer to respond to a write request to the virtual volume in one embodiment.
Figure 3B:
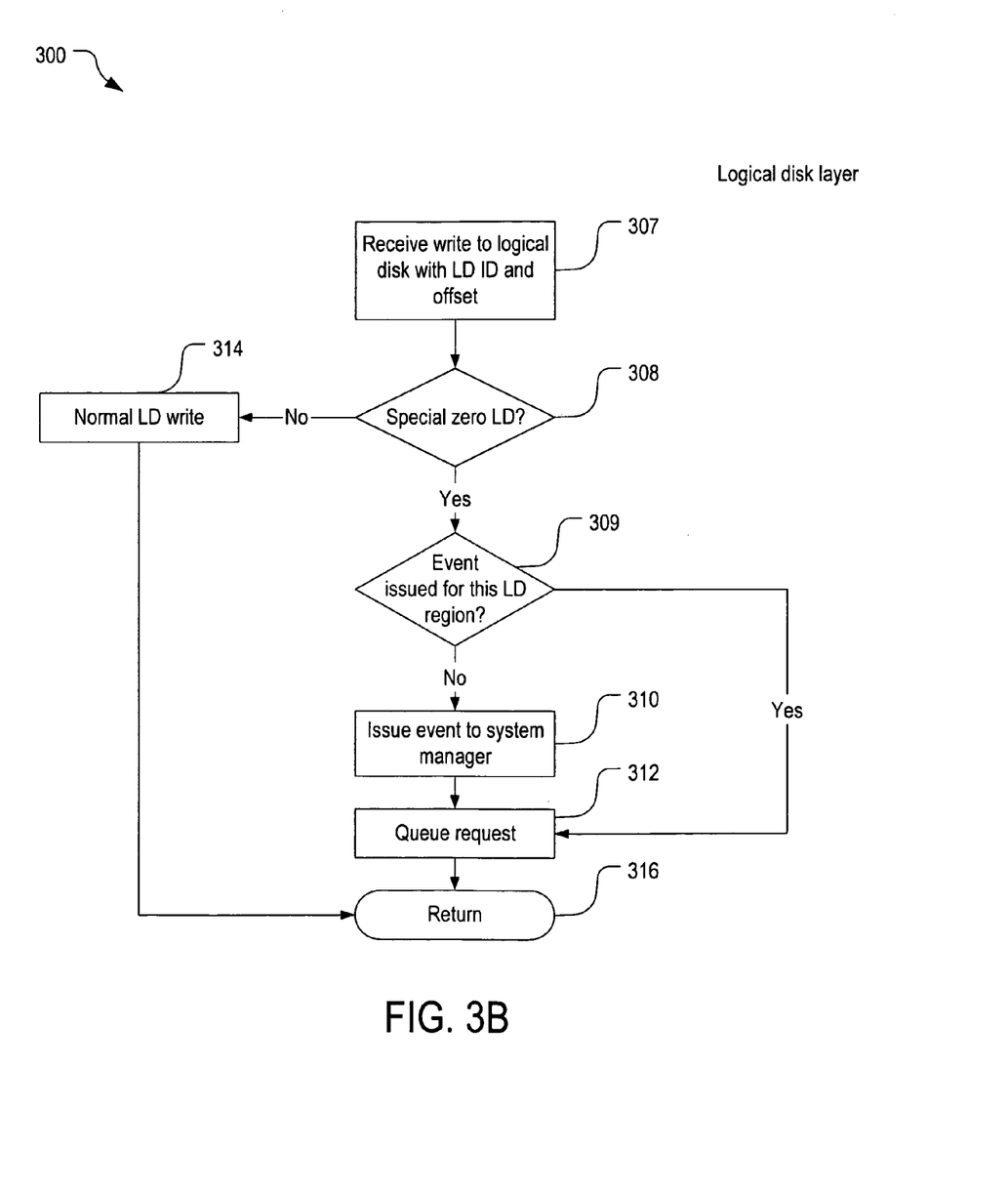

FIGS. 3A and 3B illustrate a method 300 for volume layer 110-1 and LD layer 112-1 to respond to a write request from host 118 (or an application) to virtual volume 208 in one embodiment. Method 300 may be implemented as an asynchronous function call in a main program (e.g., the operating system).

FIG. 3A illustrates a part of method 300 executed in volume layer 110-1 in one embodiment. In action 901, volume layer 110-1 receives a write request to a block on virtual volume 208. The write request identifies the block by the VV ID of virtual volume 208 and an offset of block.

In action 902, volume layer 110-1 uses the offset of the block to find the corresponding VV region in virtual volume 208.

In action 904, volume layer 110-1 maps the write from the VV region to an LD region on a logical disk. As described above, each VV region stores a pointer to a corresponding LD region, which is identified by an LD ID and an offset of the LD region. Volume layer 110-1 can determine the offset of the data block in the logical disk using the offset of the block in the virtual volume, the offset of the VV region, and the offset of the LD region as follows: $\text{Offset}_{block\ in\ LD} = \text{Offset}_{block\ in\ VV} - \text{Offset}_{VV\ region} + \text{Offset}_{LD\ region}$.

In action 906, volume layer 110-1 determines if it is in the write through mode. In the write through mode, volume layer 110-1 does not cache the write data and instead waits for the data to be written before returning the status (pass or fail) of the write to the host. Otherwise, volume layer 110-1 caches the data in a cache buffer to be written later and returns a "pass" status to host 118 without waiting for the status of the write. If volume layer 110-1 is in the write through mode, action 906 is followed by action 916. Otherwise action 906 is followed by action 908.

In action 908, volume layer 110-1 allocates (e.g., assigns) cache buffer to store the write data. Action 908 is followed by action 910.

In action 910, volume layer 110-1 inputs the write data into a page of the cache buffer and marks the page "dirty".

The pages of the cache buffer marked dirty will be retrieved and written to the logical disk later. Action 910 is followed by action 912.

In action 912, volume layer 110-1 replicates the write data to other nodes so the write data can be recovered if node 102-1 fails. Action 912 is followed by action 914.

In action 914, volume layer 110-1 returns a "pass" status to the host and ends this thread of method 300.

In action 916, volume layer 110-1 allocates a temporary buffer to store the write data. Action 916 is followed by action 918. The number of temporary buffers is much smaller than the number of the cache buffers as the write data is written immediately in the write through mode.

In action 918, volume layer 110-1 inputs the write data into the temporary buffer. Action 918 is followed by action 920.

In action 920, volume layer 110-1 issues a write to a data block of the logical disk with the LD ID and the determined offset of the data block. Action 920 is followed by action 922.

In action 922, volume layer 110-1 waits for LD layer 112-1 to finish the write to the logical disk. In one embodiment, this action can be programmed in an asynchronous manner where it waits to be called by a completion routine after the write. Action 922 if followed by action 924.

In action 924, volume layer 110-1 returns the status (pass or fail) of the write to the host, and ends this thread of method 300.

Actions 926 to 934 represent actions of another thread of method 300 that issues writes to the logical disk from the various cached write requests. In action 926, volume layer 110-1 gets or retrieves a dirty page with a write request from the cached buffer.

In action 928, volume layer 110-1 issues a write to a data block of the logical disk with the LD ID and the determined offset of the data block.

In action 930, volume layer 110-1 waits for LD layer 112-1 to finish the write to the logical disk. In one embodiment, this action can be programmed in an asynchronous manner where it waits to be called by a completion routine after the write.

In action 932, volume layer 110-1 determines if the status of the write is a pass from LD layer 112-1. If so, action 932 is followed by action 934. If the status of the write is not a pass, then action 932 is followed by action 926 where volume layer 110-1 selects a next dirty page.

In action 934, volume layer 110-1 marks the page as "clean" so it is not retrieved and can be written with new write requests.

FIG. 3B illustrates a part of method 300 executed in LD layer 112-1 in one embodiment. In action 307, LD layer 112-1 receives the write request with the LD ID and the determined offset from volume layer 110-1.

In action 308, LD layer 112-1 determines if the LD ID identifies special zero logical disk 212. As described above, special zero logical disk 212 does not have assigned physical disk space. If the LD ID identifies special zero logical disk 212, then action 308 is followed by 309. Otherwise, action 308 is followed by action 314.

In action 309, LD layer 112-1 determines if it has already issued an event for this empty VV region. The event indicates that an LD region needs to be allocated to an empty VV region. If LD layer 112-1 has issued an event for this empty VV region, action 309 is followed by action 312. Otherwise action 309 is followed by action 310. LD layer 112-1 determines if it has issued an event for this empty VV region by searching for an entry of this empty VV region in a VV queue 400 described later with FIG. 4. VV queue 400 holds write requests for empty VV regions until LD regions are allocated to them.

In action 310, LD layer 112-1 issues the event to system manager 104. In response to the event, system manager 104 allocates an LD region to the empty VV region. System manager 104 allocates the LD region in a method 500 described later in reference to FIG. 5.

In action 312, LD layer 112-1 saves the write request in VV queue 400 (FIG. 4) so the write request can be retrieved and processed after system manager 104 allocates an LD region to the empty VV region.

Figure 4:
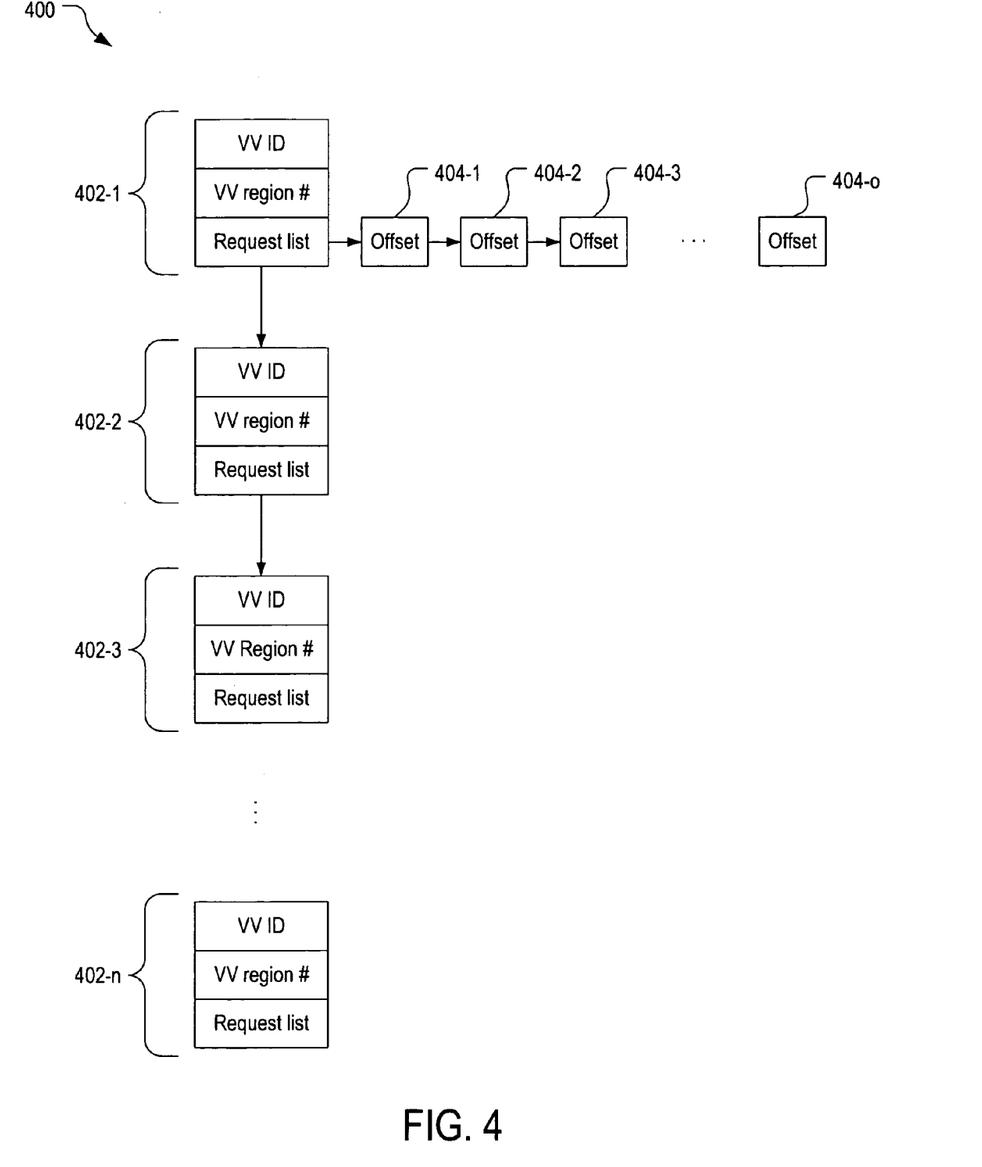
FIG. 4 illustrates a representation of a virtual volume queue in one embodiment.

FIG. 4 illustrates a representation of VV queue 400 in one embodiment. VV queue 400 is a first-in first-out queue. VV queue 400 consists of entries 402-1 to 402-n that store write requests for specific virtual volume regions. Each of entries 402-1 to 402-n stores a request list and is identified by a VV ID and a VV region number. The request list consists of a chain of write requests. The write requests stores the LD ID, offset of the LD region, VV ID, the offset of the VV region, a pointer to the actual write data, and the length of the write request (e.g., the number of blocks). For example, entry 402-1 has a request list that includes offsets 404-1 to 404-o. Action 312 is followed by action 316.

In action 314, LD layer 112-1 performs a normal write to the logical disk. Action 314 is followed by action 316.

In action 316, LD layer 112-1 returns to the main program to proceed with a subsequent procedure (e.g., a next line of code in the main program).

Figure 5A:
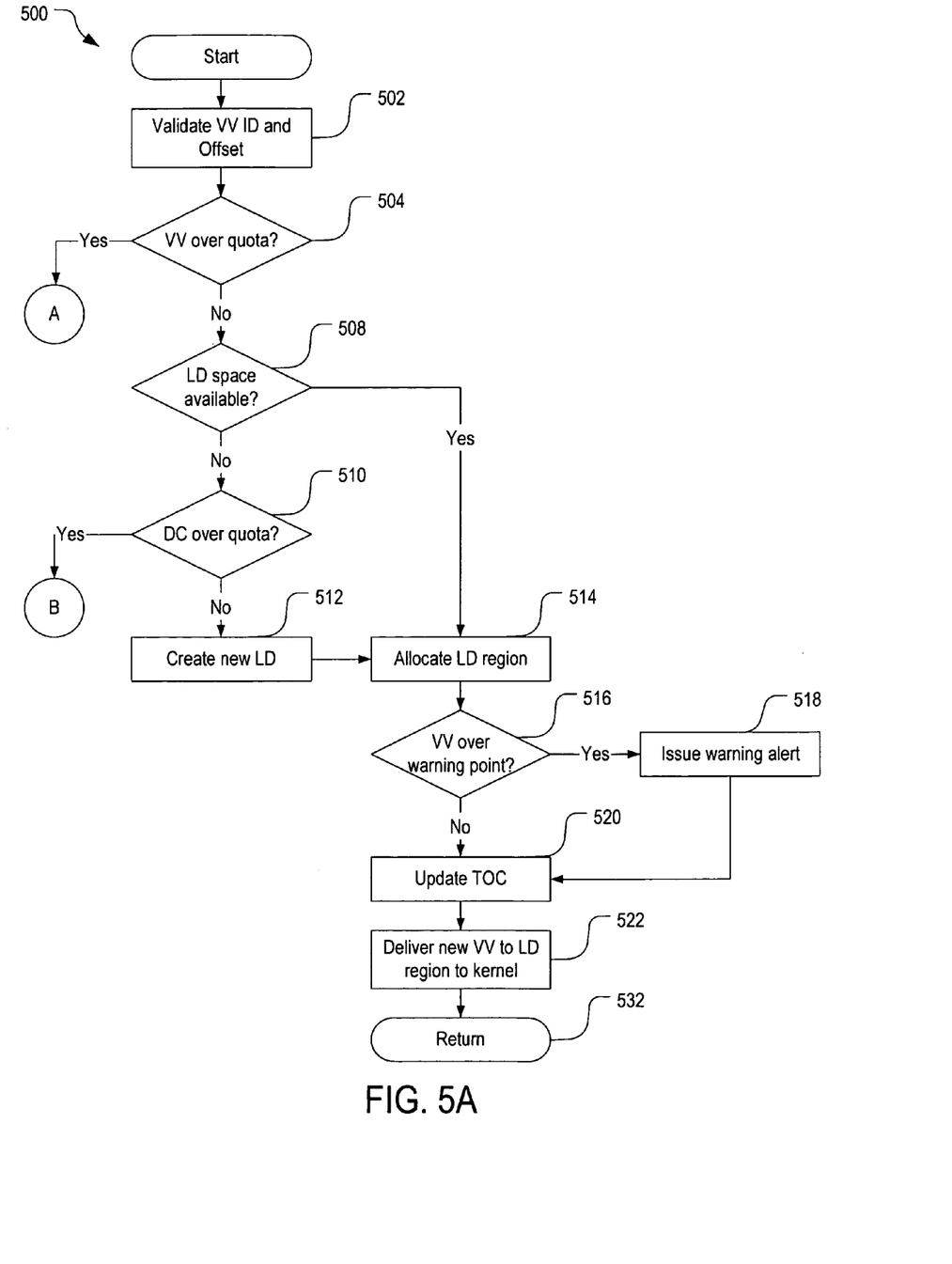
FIGS. 5A and 5B illustrate a method for a system manager to respond to an event requesting an additional logical disk region from the logical disk layer in one embodiment.
Figure 5B:
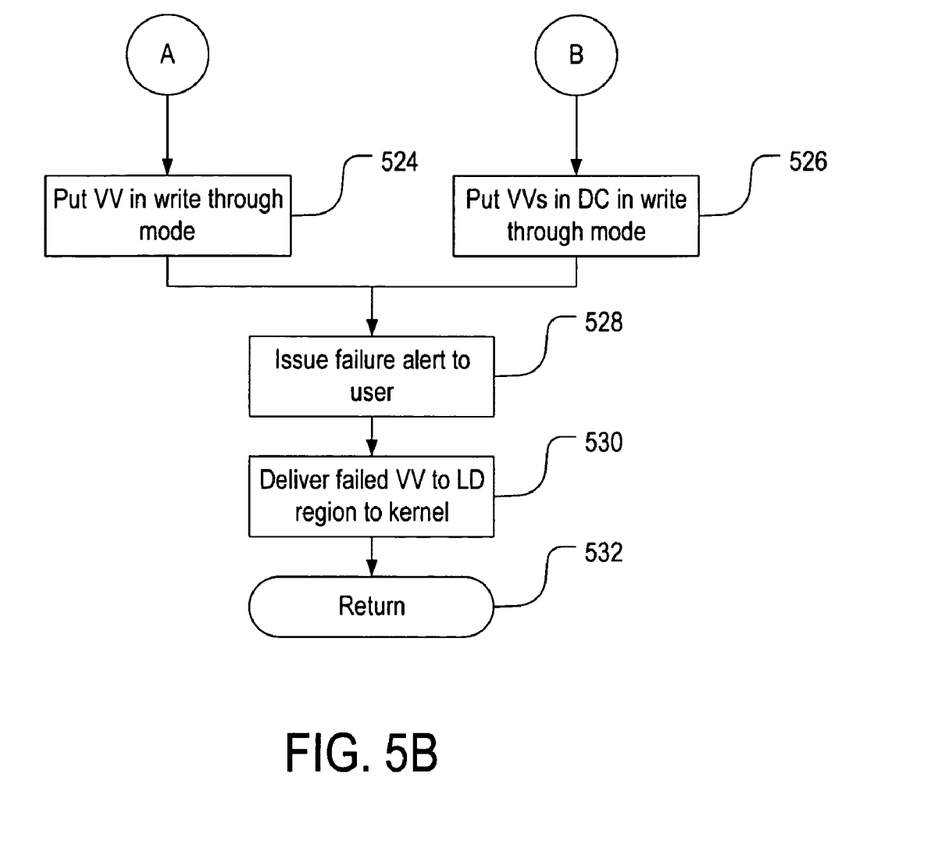

FIGS. 5A and 5B illustrate a method 500 for system manager 104 to respond to the event from an LD layer (e.g., logical disk layer 112-1) in one embodiment. Method 500 may be implemented as an interrupt level process within a main program.

In action 502, system manager 104 validates the VV ID and the offset of the VV region by retrieving a data allocation control structure (DC) for the virtual volume identified by the VV ID. DC is a part of system manager 104 that sets the maximum physical allocation for the total of all the virtual volumes owned (i.e., controlled) by the DC, and a warning point and a maximum physical allocation for each individual virtual volume controlled by the DC. DC also sets the RAID characteristics of the logical disks created by the DC to provide the physical storage for the virtual volumes in the DC and the set of nodes in the cluster from which the physical disk drives are selected to construct the logical disks.

In action 504, system manager 104 determines if the physical allocation of the identified virtual volume (e.g., virtual volume 208) is over the maximum physical allocation specified by the DC. The maximum physical allocation can have a default value or be set by the user. If the virtual volume is over the maximum physical allocation, action 504 is followed by action 524 (FIG. 5B). If not, action 504 is followed by action 508.

In action 508, system manager 104 determines if an LD region is available in an existing logical disk (e.g., logical disk 207-1). If an LD region is available, action 508 is followed by action 514. If not, action 508 is followed by action 510.

In action 510, system manager 104 determines if the total physical allocation of virtual volumes owned by the DC is over the maximum physical allocation specified by the DC. If the DC is over the maximum physical allocation, action 510 is followed by action 526 (FIG. 5B). If not, action 510 is followed by action 512.

In action 512, system manager 104 creates a new LD (e.g., logical disk 207-2) for the LD layer from chunklets. Action 512 is followed by action 514.

In action 514, system manager 104 allocates (e.g., assigns) an available LD region in the logical disk to be mapped to a VV region. The LD region is identified by an LD ID and an offset from the start of the logical disk. Action 514 is followed by action 516.

In action 516, system manager 104 determines if the size of the physical space assigned to the virtual volume is over the warning point specified by the DC. The warning point provides an early warning to the user that the physical limit is approaching. The warning point can have a default value or be set by the user. If the virtual volume is over the warning point, action 516 is followed by action 518. If not, action 516 is followed by action 520.

In action 518, system manager 104 issues a warning alert to the user. Action 518 is followed by action 520.

In action 520, system manager 104 updates the table of content (TOC). TOC stores the organization of the virtual volumes, the logical disks, and the chunklets of server 100 on one or more physical disk drives. Action 520 is followed by action 522.

In action 522, system manager 104 delivers the LD region to volume layer 110-1 so volume layer 110-1 can update virtual volume 208. Action 522 is followed by action 532, which returns to the main program to proceed with a subsequent procedure.

In action 524, system manager 104 puts virtual volume 208 in write through mode to prevent volume layer 110-1 from caching additional write data that will not be able to be written to a logical disk. Action 524 is followed by action 528.

In action 526, system manager 104 puts all the virtual volumes owned by the DC in the write through mode to prevent volume layer 110-1 from caching additional write data. Action 526 is followed by action 528.

In action 528, system manager 104 issues a failure alert to the user that physical storage space is used to its limit. Action 528 is followed by action 530.

In action 530, system manager 104 delivers a call to the kernel indicating that the mapping request has failed and no actual LD region is assigned to the empty VV region. Action 530 is followed by action 532, which returns to the main program to proceed with a subsequent procedure.

Figure 6:
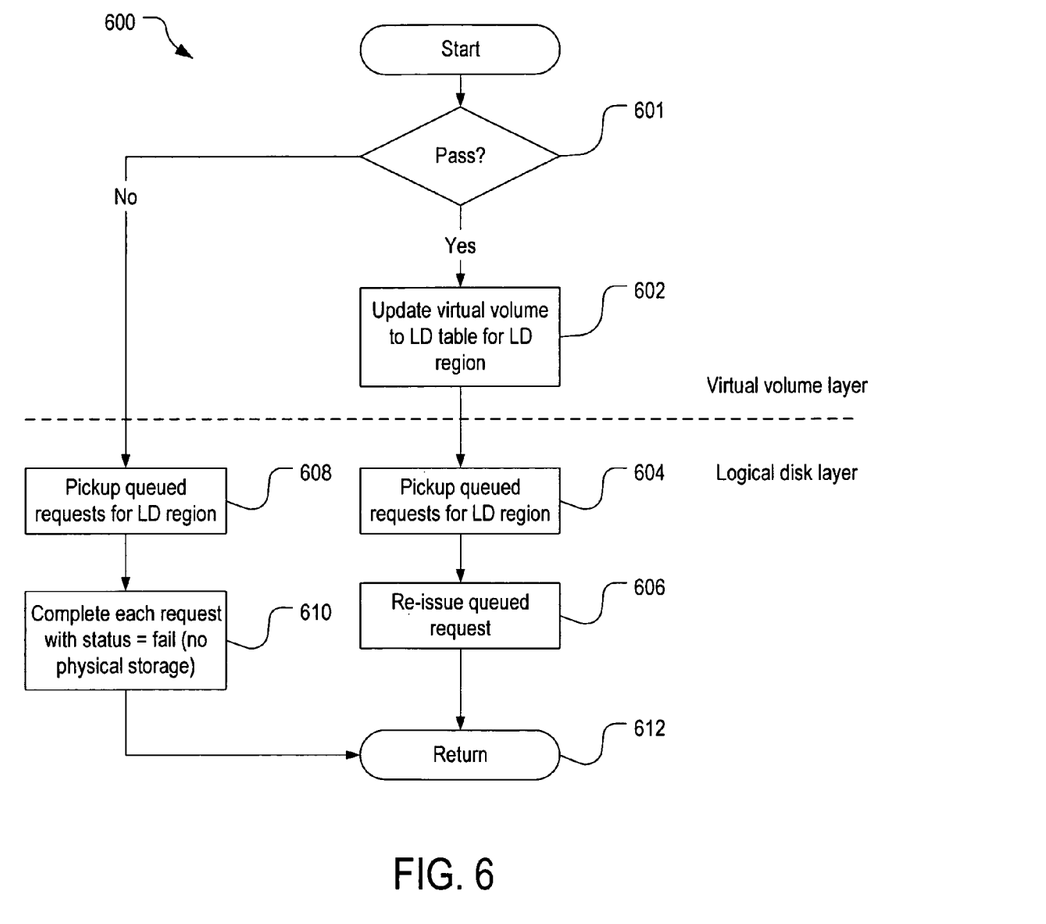
FIG. 6 illustrates a method for the volume layer and the logical disk layer to write to a virtual volume after the system manager delivers the additional logical disk region in one embodiment.

FIG. 6 illustrates a method 600 for a volume layer (e.g., volume layer 110-1) and a logical disk layer (e.g., LD layer 112-1) to write to a virtual volume after system manager 104 delivers an additional LD region in one embodiment. Method 600 may be implemented as a kernel routine called by a user level program.

In action 601, volume layer 110-1 determines if an LD region has been successfully allocated by system manager 104 for the write request. If so, action 601 is followed by action 602. If an LD region has not been successfully allocated by system manger 104 for the write request, then action 601 is followed by action 608. An LD region has not been successfully allocated by system manager 104 if system manager 104 delivers a call to LD layer 112-1 indicating a mapping failure in action 530 described above.

In action 602, volume layer 110-1 updates the empty VV region with the additional LD region from system manager 104. Specifically, volume layer 110-1 updates the pointer in the empty VV region with the LD ID and the offset of the additional LD region. Action 602 is followed by action 604.

In action 604, LD layer 112-1 picks up the queued request generated in action 312 (FIG. 3B) for this VV region.

Specifically, LD layer 112-1 searches VV queue 400 (FIG. 4) for an entry of the formerly empty VV region. After it finds such an entry, LD layer 112-1 retrieves the request list with all the write requests for the formerly empty VV region. Action 604 is followed by action 606.

In action 606, LD layer 112-1 reissues the write requests as normal LD writes. Action 606 is followed by action 612, which returns to the main program to proceed with a subsequent procedure.

In action 608, LD layer 112-1 picks up the queued request generated in action 312 for this VV region. Action 608 is followed by action 610.

In action 610, LD layer 112-1 completes or responds to each write request with a fail status indicating to the host there is no more physical storage space. Action 608 is followed by action 612, which returns to the main program to proceed with a subsequent procedure.

Figure 7:
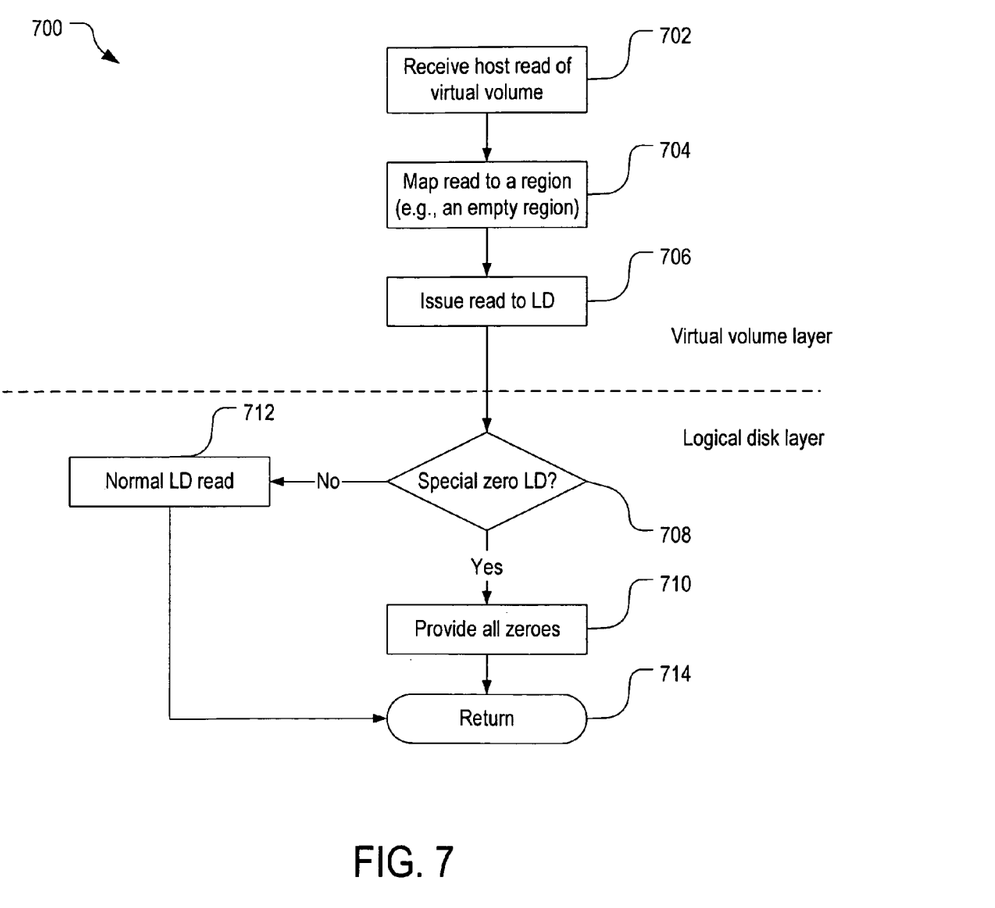
FIG. 7 illustrates a method for the volume layer and the logical disk layer to respond to a read request from the host in one embodiment.

FIG. 7 illustrates a method 700 for a volume layer (e.g., volume layer 110-1) and a LD layer (e.g., logical disk layer 112-1) to respond to a read request from host 118 in one embodiment. Method 700 may be implemented as an interrupt level process within the main program.

In action 702, volume layer 110-1 receives from host system 118 a read request of a data block in a virtual volume (e.g., virtual volume 208). The read request identifies the data block by a VV ID and an offset of the start of virtual volume 208.

In action 704, volume layer 110-1 uses the offset of the block to find the corresponding VV region in virtual volume 208.

In action 706, volume layer 110-1 maps the read from the VV region to an LD region on a logical disk. Volume layer 110-1 determines the LD ID and the offset of the data block in the logical disk in the same manner as action 904 (FIG. 3A) described above.

In action 708, LD layer 112-1 determines if the LD ID correspond to special zero logical disk 212. If so, action 708 is followed by action 710. If the LD ID does not correspond to special zero logical disk 212, action 708 is followed by action 712.

In action 710, LD layer 112-1 provides all zeroes in response to the read request. Action 710 is followed by action 714.

In action 712, LD layer 112-1 performs a normal read to the logical disk identified by the logical disk ID and offset. Action 712 is followed by action 714.

In action 714, LD layer 112-1 returns to the main program to proceed with a subsequent procedure.

Various other adaptations and combinations of features of the embodiments disclosed are within the scope of the invention. Numerous embodiments are encompassed by the following

What is claimed is:

1. A method for allocating physical storage, comprising:
   creating a virtual volume, the virtual volume comprising a virtual volume region storing a pointer to a zero logical disk, wherein the zero logical disk is not mapped to any physical storage;
   receiving from a host a write request to the virtual volume;
   mapping the write request to the virtual volume region;
   mapping the virtual volume region to the zero logical disk;
   in response to said mapping the virtual volume region to the zero logical disk, assigning a logical disk region to the virtual volume region, wherein the logical disk region is assigned to physical storage; and
   writing to the logical disk region.

2. The method of claim 1, further comprising, prior to said writing to the logical disk region:
   caching the write request; and
   sending a pass status to the host indicating the write request has been completed.

3. The method of claim 2, wherein the virtual volume is located at a node in a system, the method further comprising:
   replicating the write request to another node in the system.

4. The method of claim 1, farther comprising, after said writing to the logical disk region:
   sending a pass status to the host indicating the write request has been completed.

5. The method of claim 1, further comprising, prior to said assigning a logic disk region to the virtual volume region:
   determining if the virtual volume is greater than a size limit; and
   issuing an alert if the virtual volume is greater than the size limit.

6. The method of claim 1, further comprising, prior to said assigning a logic disk region to the virtual volume region:
   determining if there is at least one logical disk region available to assign;
   if there is not at least one logical disk region available to assign, determining if a pool of logical disks for providing logical disk regions is greater than a size limit; and
   issuing an alert if the pool is greater than the size limit.

7. The method of claim 1, further comprising, prior to said assigning a logic disk region to the virtual volume region:
   creating a logic disk comprising the logical disk region.

8. The method of claim 7, further comprising, prior to said creating a logic disk:
   queuing the write request and another write request to the virtual volume region until said assigning a logical disk region to the virtual volume region.

9. The method of claim 1, further comprising, subsequent to said assigning a logic disk region to the virtual volume region:
   determining if the virtual volume is greater than a size limit, and
   issuing an alert that the virtual volume is greater than the size limit.

* * * * *